United States Patent
Harrell

[19]

[11] Patent Number: 6,058,890

[45] Date of Patent: May 9, 2000

[54] WATER ABSORBENT ROBE FOR PETS

[76] Inventor: Kimberly D. Harrell, 14403 Myer Ter., Rockville, Md. 20853

[21] Appl. No.: 09/109,194

[22] Filed: Jul. 2, 1998

[51] Int. Cl.[7] .................................................. A01K 13/00
[52] U.S. Cl. .............................. 119/850; 54/79.1; 54/80.1
[58] Field of Search ................................... 119/850, 854, 119/671, 678, 600, 601, 650, 653, 654; 54/79.1, 79.2, 79.4, 79.3; D30/145

[56] References Cited

U.S. PATENT DOCUMENTS

| | | | |
|---|---|---|---|
| 134,921 | 1/1873 | Morris | 54/79.1 |
| D. 142,815 | 11/1945 | Ardmore | D30/145 |
| D. 213,053 | 12/1968 | Woodhaven | D30/145 |
| D. 220,191 | 3/1971 | Giordano | D30/145 |
| 352,470 | 11/1886 | Logan | 54/79.2 |
| D. 374,315 | 10/1996 | Caditz | D30/145 |
| D. 379,687 | 6/1997 | Curtis | D30/145 |
| 935,166 | 9/1909 | Horabeck | 54/79.2 |
| 1,595,834 | 8/1926 | Griffiths | 54/79.1 |
| 1,772,827 | 8/1930 | Caster-Udell | 54/79.1 |
| 2,131,495 | 9/1938 | Allen | 54/79.2 |
| 2,417,803 | 3/1947 | De Mar | 54/79.1 |
| 3,918,238 | 11/1975 | Iozzio | 54/79.2 |
| 4,355,600 | 10/1982 | Zielinski | 119/850 |
| 5,003,756 | 4/1991 | Mazzotta, Sr. | 54/79 |
| 5,060,458 | 10/1991 | Curtis | 54/79 |
| 5,463,985 | 11/1995 | Shover | 119/850 |

FOREIGN PATENT DOCUMENTS

| | | | |
|---|---|---|---|
| 436655 | 10/1935 | United Kingdom | 54/79.2 |

*Primary Examiner*—Michael J. Carone
*Assistant Examiner*—Judith A. Nelson

[57] ABSTRACT

A pet cover is provided including a sheet of flexible absorbent material. Also included is a plurality of fasteners mounted on the sheet for conforming the sheet on a pet to prevent the pet from shaking water from its natural coat.

2 Claims, 2 Drawing Sheets

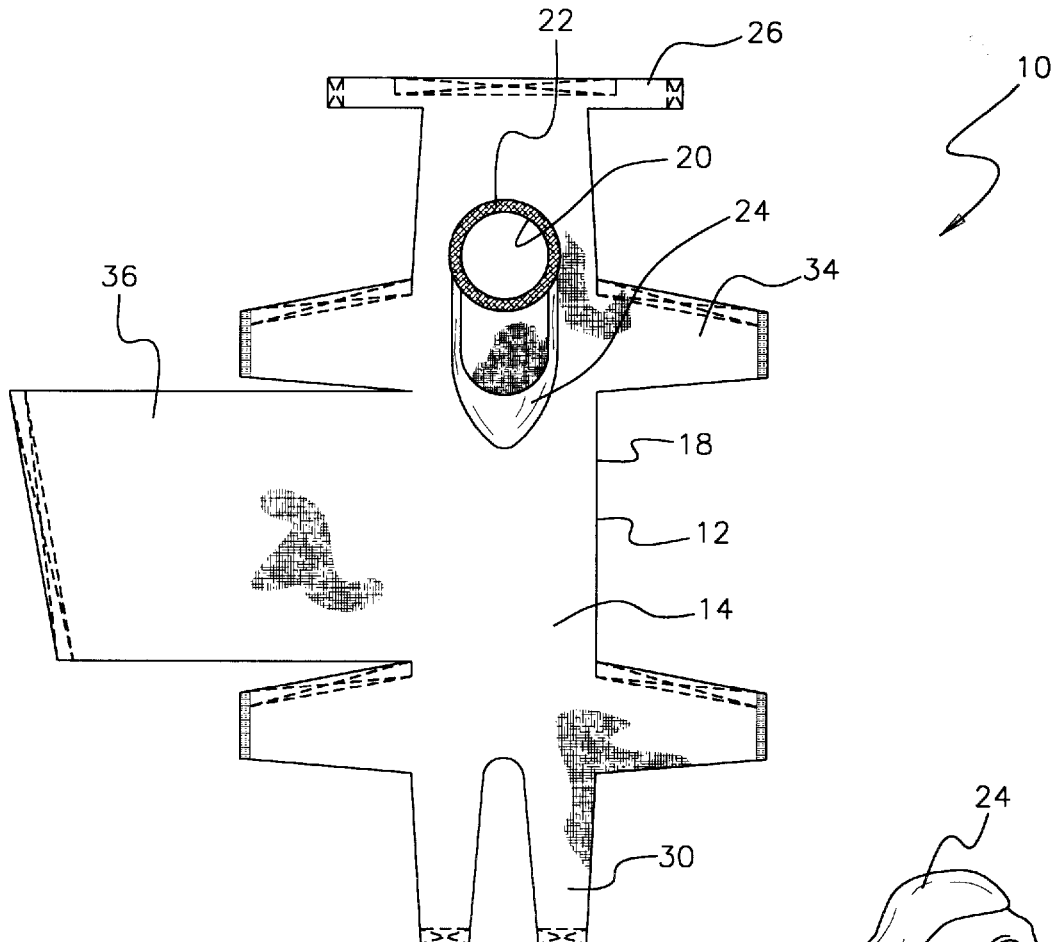
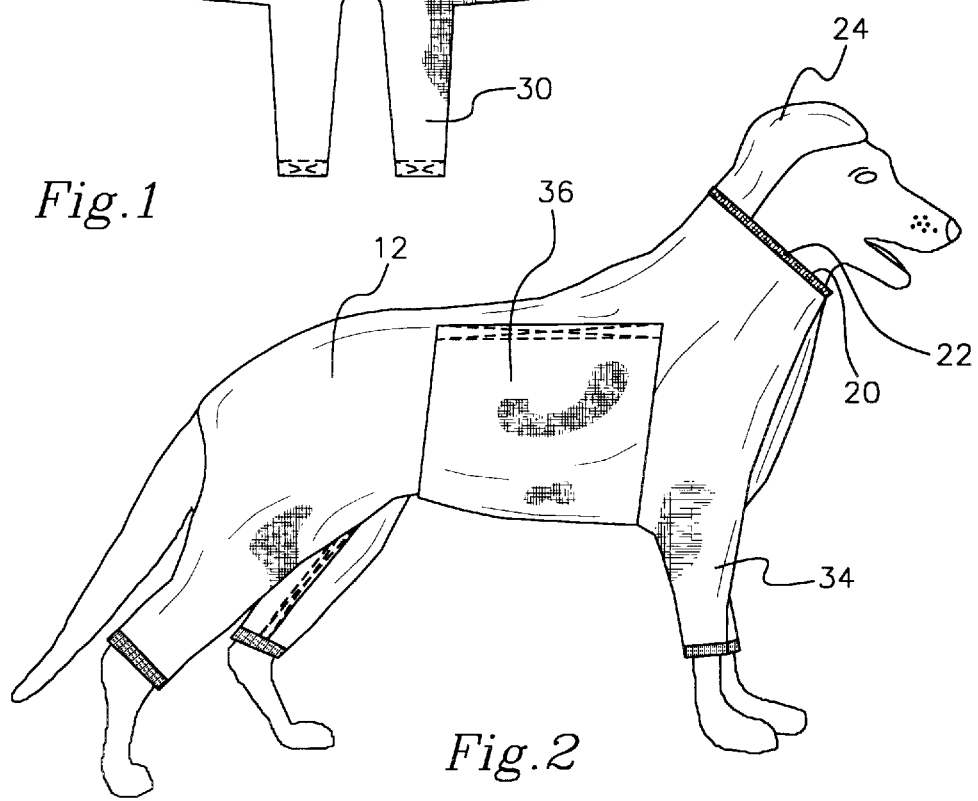

WATER ABSORBENT ROBE FOR PETS

BACKGROUND OF THE INVENTION

1. Field of the Invention

The present invention relates to pet clothing and more particularly pertains to a new water absorbent robe for pets for precluding a pet from shaking water from its natural coat.

2. Description of the Prior Art

The use of pet clothing is known in the prior art. More specifically, pet clothing heretofore devised and utilized are known to consist basically of familiar, expected and obvious structural configurations, notwithstanding the myriad of designs encompassed by the crowded prior art which have been developed for the fulfillment of countless objectives and requirements.

Known prior art pet clothing include U. S. Pat. No. 3,918,238; U.S. Pat. No. 5,060,458; U.S. Pat. Des No. 379,687; U.S. Pat. No. 5,003,756; U.S. Pat. No. 5,463,985; and U.S. Pat. No. 935,166.

In these respects, the water absorbent robe for pets according to the present invention substantially departs from the conventional concepts and designs of the prior art, and in so doing provides an apparatus primarily developed for the purpose of precluding a pet from shaking water from its natural coat and facilitating the drying of the pet.

SUMMARY OF THE INVENTION

In view of the foregoing disadvantages inherent in the known types of pet clothing now present in the prior art, the present invention provides a new water absorbent robe for pets construction wherein the same can be utilized for precluding a pet from shaking water from its natural coat.

The general purpose of the present invention, which will be described subsequently in greater detail, is to provide a new water absorbent robe for pets apparatus and method which has many of the advantages of the pet clothing mentioned heretofore and many novel features that result in a new water absorbent robe for pets which is not anticipated, rendered obvious, suggested, or even implied by any of the prior art pet clothing, either alone or in any combination thereof.

To attain this, the present invention generally comprises a sheet of flexible absorbent material having an outer face, an inner face and a periphery. The periphery has a generally rectangular configuration defined by a pair of elongated side edges and a pair of short end edges. As shown in FIGS. 1 & 3, the sheet has a circular opening formed therein adjacent to a first one of the end edges. Ideally, the circular opening has an elastic lining. Further, a hood is mounted along ½ a periphery of the opening and extending from the outer face of the sheet. The first one of the end edges of the sheet preferably has a pair of thin laterally extending strips extending therefrom in alignment therewith. As shown in FIG. 3, the laterally extending strips have pile fasteners mounted on the inner face of sheet. A second one of the end edges of the sheet has a pair of longitudinally extending strips extending therefrom in a spaced, parallel relationship. Pile fasteners are mounted along outboard edges of the longitudinally extending strips on the inner face of the sheet. Each of the side edges of the sheet have a pair of side strips. As shown in FIGS. 2 & 3, the side strips extend from the sheet at points of the side edges at the second end edge of the sheet and adjacent to the opening of the sheet. Each of the side strips has a beveled front edge with a pile fastener situated therealong on the inner face of the sheet. Each of the side strips further has an elastic band mounted along an outboard edge thereof on the outer face of the sheet. Finally, one of the side edges of the sheet has a large rectangular portion extending therefrom between and contiguous with the side strips. An outboard edge of the large rectangular portion is beveled and also has a pile fastener mounted therealong on the inner face of the sheet.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new water absorbent robe for pets apparatus and method which has many of the advantages of the pet clothing mentioned heretofore and many novel features that result in a new water absorbent robe for pets which is not anticipated, rendered obvious, suggested, or even implied by any of the prior art pet clothing, either alone or in any combination thereof.

It is another object of the present invention to provide a new water absorbent robe for pets which may be easily and efficiently manufactured and marketed.

It is a further object of the present invention to provide a new water absorbent robe for pets which is of a durable and reliable construction.

An even further object of the present invention is to provide a new water absorbent robe for pets which is susceptible of a low cost of manufacture with regard to both materials and labor, and which accordingly is then susceptible of low prices of sale to the consuming public, thereby making such water absorbent robe for pets economically available to the buying public.

Still yet another object of the present invention is to provide a new water absorbent robe for pets which provides in the apparatuses and methods of the prior art some of the advantages thereof, while simultaneously overcoming some of the disadvantages normally associated therewith.

Still another object of the present invention is to provide a new water absorbent robe for pets for precluding a pet from shaking water from its natural coat.

Even still another object of the present invention is to provide a new water absorbent robe for pets that includes a sheet of flexible absorbent material. Also included is a plurality of fasteners mounted on the sheet for conforming the sheet on a pet to prevent the pet from shaking water from its natural coat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top view of the outer face of the sheet of the present invention.

FIG. 2 is a side view of the present invention in use.

DESCRIPTION OF THE PREFERRED EMBODIMENT

Figure 3:
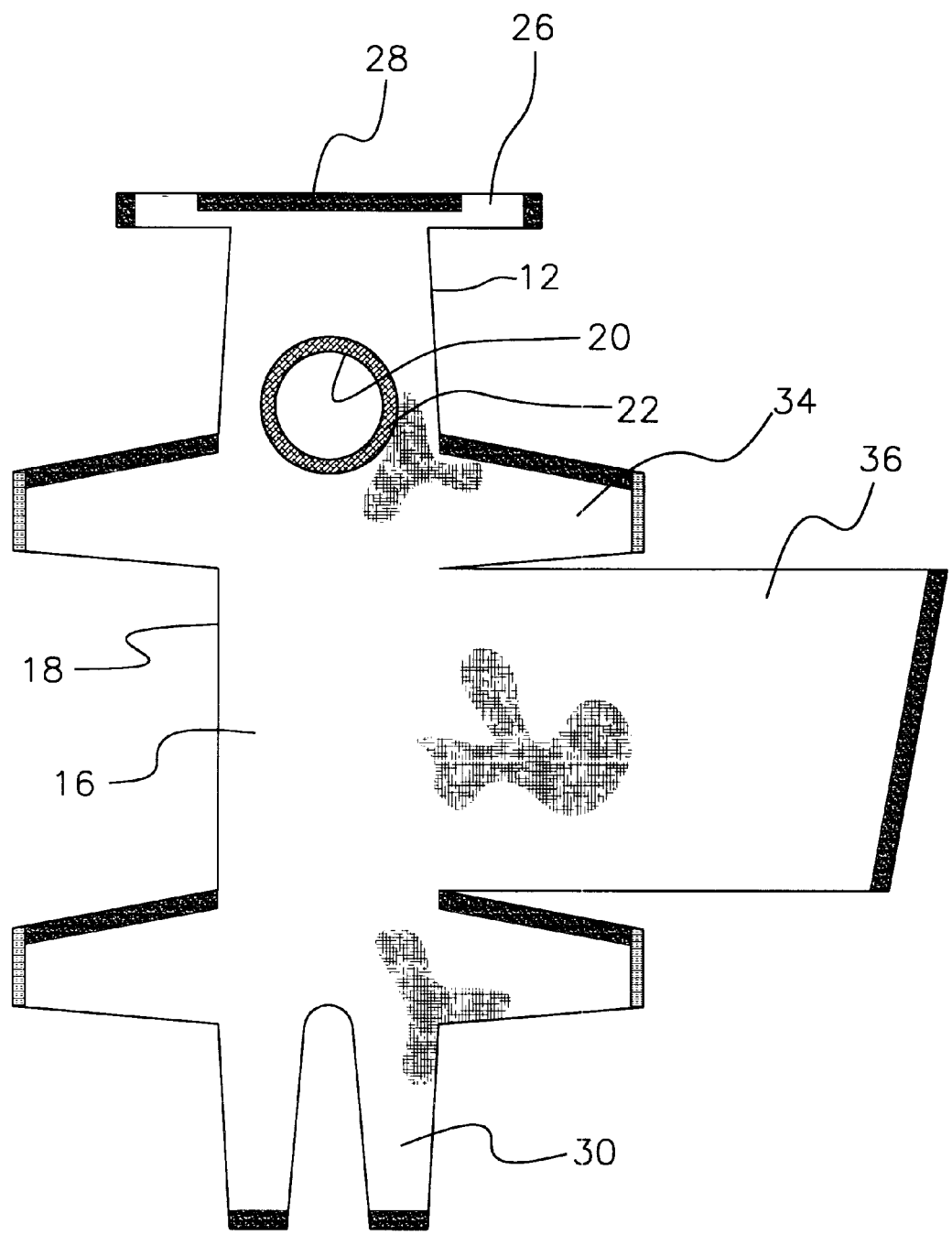
FIG. 3 is a bottom view of the inner face of the sheet of present invention.

With reference now to the drawings, and in particular to FIGS. 1 through 3 thereof, a new water absorbent robe for pets embodying the principles and concepts of the present invention and generally designated by the reference numeral 10 will be described.

The present invention, designated as numeral 10, includes a sheet 12 of flexible absorbent material including fleece, polyester/nylon blend material, and the like. The sheet has an outer face 14, an inner face 16 and a free periphery 18. The periphery has a generally rectangular configuration defined by a pair of elongated side edges and a pair of short end edges. As shown in FIGS. 1 & 3, the sheet has a circular opening 20 formed therein adjacent to a first one of the end edges. Ideally, the circular opening has an elastic lining 22. Further, a hood 24 is mounted along ½ a periphery of the opening and extending from the outer face of the sheet. In use, the sheet is placed on a back of the pet with a head of the pet extending through the circular opening. It should be noted that the sheet may take on any size to suit the size of the pet.

The first one of the end edges of the sheet preferably has a pair of thin laterally extending strips 26 extending from the first end edge of the sheet in alignment therewith. As shown in FIG. 3, the laterally extending strips have pile fasteners 28 mounted on the inner face of sheet. When the present invention is used, the laterally extending strips are secured to the sheet such that a front extent of the sheet conforms to a breast of the pet.

A second one of the end edges of the sheet has a pair of longitudinally extending strips 36 extending therefrom in a spaced, parallel relationship. Pile fasteners are mounted along outboard edges of the longitudinally extending strips on the inner face of the sheet. When the present invention is used, the longitudinally extending strips conform to a rear end of the pet and further encompasses a tail of the pet.

Each of the side edges of the sheet has a pair of side strips 34. As shown in FIGS. 2 & 3, the side strips extend from the sheet at points of the side edges near the second end edge of the sheet and adjacent to the opening of the sheet. Each of the side strips has a beveled front edge with a pile fastener situated therealong on the inner face of the sheet. Each of the side strips further has an elastic band mounted along an outboard edge thereof on the outer face of the sheet. In operation, each of the side strips are adapted to be formed into elongated, tapering leg-receiving sleeves by way of the pile fasteners.

Finally, one of the side edges of the sheet has a large rectangular portion 36 extending therefrom between and contiguous with the side strips. An outboard edge of the large rectangular portion is beveled and also has a pile fastener mounted therealong on the inner face of the sheet. The portion 36 serves to encompass a lower belly of the pet and further provides a coupling surface for the pile fasteners of strips 26 & 30. It should be understood that the pile fasteners of the present invention are attachable directly to any portion of the sheet. In alternate embodiments, other types of fasteners may be employed which include, but are not limited to, snaps, latches, zippers and any other coupling device that is capable of accomplishing a similar objective.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet cover comprising, in combination:
   a sheet of flexible absorbent material having an outer face, an inner face and a periphery, the periphery having a generally rectangular configuration defined by a pair of elongated side edges and a pair of short end edges, wherein the sheet has a circular opening formed therein adjacent to a first one of the end edges with an elastic lining and a hood mounted along ½ a periphery of the opening and extending from the outer face of the sheet;
   said first one of the end edges of said sheet having a pair of thin laterally extending strips extending therefrom in alignment therewith, the laterally extending strips having pile fasteners mounted on the inner face of sheet;
   a second one of the end edges of said sheet having a pair of longitudinally extending strips extending therefrom in a spaced, parallel relationship with pile fasteners mounted along outboard edges of the longitudinally extending strips on the inner face of the sheet;

each of the side edges of said sheet having a pair of side strips each extending from points of the side edges at the second end edge of the sheet and adjacent to the opening of the sheet, each of the side strips having a beveled front edge with a pile fastener situated therealong on the inner face of the sheet, each of the side strips further having an elastic band mounted on an outboard edge thereof on the outer face of the sheet;

one of said side edges of said sheet having a large rectangular portion extending therefrom between and contiguous with the side strips, an outboard edge of the large rectangular portion being beveled and having a pile fastener mounted therealong on the inner face of the sheet.

2. A pet cover comprising: a sheet of flexible absorbent material having an outer face an inner face and a periphery, the absorbent sheet being shaped such that the absorbent sheet is adapted to generally conform to the shape of a pet, the periphery having a generally rectangular configuration defined by pair of elongated side edges and a pair of short end edges, the absorbent sheet having a generally circular opening adjacent to a first one of the end edges with an elastic lining and a hood mounted along a portion of a periphery of the opening and extending from the outer face of the sheet, the opening being adapted for permitting insertion of the pet's head through the opening such that the absorbent sheet substantially covers a back, chest and legs of the pet to facilitate drying of the pet; and a plurality of fasteners mounted on the absorbent sheet for conforming the sheet on the pet;

said first one of the end edges of said sheet having a flair of thin laterally extending strips extending therefrom in alignment therewith, the laterally extending strips each having one of the plurality of fasteners mounted on the inner face of sheet;

a second one of the end edges of said sheet having a pair of longitudinally extending strips extending therefrom in a spaced, parallel relationship, each of the strips having one of the plurality of fasteners mounted along outboard edges of the longitudinally extending strips on the inner face of the sheet;

each of the side edges of said sheet having a pair of side strips each extending from points of the side edges at the second end edge of the sheet and adjacent to the opening of the sheet, each of the side strips having a beveled front edge and each having one of the plurality of fasteners situated therealong on the inner face of the sheet, each of the side strips further having an elastic band mounted on an outboard edge thereof on the outer face of the sheet;

one of said side edges of said sheet having a portion extending therefrom between the side strips, an outboard edge of the portion having one of the plurality of fasteners mounted therealong on the inner face of the sheet.

* * * * *